United States Patent
Damasceno Soares et al.

(10) Patent No.: US 12,265,024 B2
(45) Date of Patent: Apr. 1, 2025

(54) SHEAROGRAPHY AND INTERFEROMETRY SENSOR WITH MULTIDIRECTIONAL DYNAMIC PHASE SHIFTING AND METHOD OF INSPECTION AND MEASUREMENT OF VIBRATION MODES

(71) Applicants: Petróleo Brasileiro S.A.-Petrobras, Rio de Janeiro (BR); Universidade Federal De Santa Catarina-UFSC, Florianópolis (BR)

(72) Inventors: Sergio Damasceno Soares, Petrópolis (BR); Fabiana Dias Fonseca Martins, Rio de Janeiro (BR); Ana Lucia Fampa Seabra D'almeida, Rio de Janeiro (BR); Mauro Eduardo Benedet, São José (BR); Armando Albertazzi Gonçalves Junior, Florianópolis (BR); Analucia Vieira Fantin, Florianópolis (BR); Daniel Pedro Willemann, Laguna (BR); Estiven Sanchez Barrera, Florianópolis (BR)

(73) Assignees: Petróleo Brasileiro S.A.—Petrobras, Rio de Janeiro (BR); Universidade Federal De Santa Catarina—UFSC, Florianópolis (BR)

(*) Notice: Subject to any disclaimer, the term of this patent is extended or adjusted under 35 U.S.C. 154(b) by 287 days.

(21) Appl. No.: 17/780,442

(22) PCT Filed: Nov. 17, 2020

(86) PCT No.: PCT/BR2020/050481
§ 371 (c)(1),
(2) Date: May 26, 2022

(87) PCT Pub. No.: WO2021/102539
PCT Pub. Date: Jun. 3, 2021

(65) Prior Publication Data
US 2023/0012001 A1    Jan. 12, 2023

(30) Foreign Application Priority Data
Nov. 26, 2019    (BR) ..................... 1020190249463

(51) Int. Cl.
*G01N 21/45*    (2006.01)
*G01N 21/88*    (2006.01)
*H04N 23/45*    (2023.01)

(52) U.S. Cl.
CPC ............. *G01N 21/45* (2013.01); *G01N 21/88* (2013.01); *G01N 2201/0634* (2013.01); *H04N 23/45* (2023.01)

(58) Field of Classification Search
CPC .......... G01N 21/45; G01N 2021/8887; G01N 21/8851; G01B 9/02; G01B 11/16; G01B 11/162
See application file for complete search history.

(56) References Cited

U.S. PATENT DOCUMENTS

| 4,643,576 A | 2/1987 | Kanoh et al. |
| 4,884,697 A | 12/1989 | Takacs et al. |

(Continued)

FOREIGN PATENT DOCUMENTS

| CN | 105371778 A | 3/2016 |
| CN | 108871220 A | 11/2018 |

(Continued)

OTHER PUBLICATIONS

Barrera, Estiven Sánchez. "Design of a Robust Interferometer Using Polarization for Shearography Inspection in Vibration Environments." Federal University of Santa Catarina. Florianópolis (2016): 125 (Year: 2016).*

(Continued)

*Primary Examiner* — Tarifur R Chowdhury

Assistant Examiner — Roberto Fabian, Jr.
(74) Attorney, Agent, or Firm — ArentFox Schiff LLP

(57) ABSTRACT

The present invention addresses to a multidirectional dynamic phase shifting interferometry (DPSI) shearography and interferometry sensor. The present invention uses a configuration with three fixed prisms, or a single fixed three-facet optical prism constructed so as to achieve the same effect as three prisms and thus simultaneously obtain three images with phase shifting. The present invention also encompasses a method of inspection and measurement of vibration modes using said sensor.

8 Claims, 10 Drawing Sheets

(56) References Cited

U.S. PATENT DOCUMENTS

| | | | | |
|---|---|---|---|---|
| 5,357,341 | A * | 10/1994 | Kuchel | G01B 9/02057 356/520 |
| 2003/0179382 | A1* | 9/2003 | Peterson, Jr. | G01N 29/50 356/502 |
| 2011/0085180 | A1* | 4/2011 | Beerens | G03F 7/70775 356/614 |

FOREIGN PATENT DOCUMENTS

| | | | |
|---|---|---|---|
| DE | 4414287 | A1 | 10/1994 |
| DE | 10010791 | A1 | 9/2001 |
| EP | 3382331 | A1 | 10/2018 |
| WO | 2004068066 | A2 | 8/2004 |

OTHER PUBLICATIONS

Barrera, Estiven Sánchez, et al. "Multiple-aperture one-shot shearography for simultaneous measurements in three shearing directions." Optics and Lasers in Engineering 111 (2018): 86-92 (Year: 2018).*

Hooshmand-Ziafi, Helia, et al. "Common-path spatial phase-shift speckle shearography using a glass plate." Review of Scientific Instruments 90.10 (2019) (Year: 2019).*

International Search Report, issued by International Searching Authority in corresponding International Application No. PCT/BR2020/050481, mailed Jan. 14, 2021.

Barrera, "Shearografia Instantânea multidirecional", Tese de Doutorado, Universidade Federal de Santa Catarina, UFSC, Nov. 21, 2018. https://repositorio.ufsc.br/handle/123456789/205590.

Bortoli, "Método híbrido usando shearografia para determinar raios de furos passantes em tubos metálicos sob reparos de materiais compósitos", Dissertação de Mestrado, Universidade Federal de Santa Catarina, UFSC, Feb. 28, 2019. https://repositorio.ufsc.br/handle/123456789/215181?show=full.

Figueredo, "Inspeção de defeitos em revestimentos de materiais compósitos em ambiente subaquático pela tecnica de shearografia", Dissertação de Mestrado, Universidade Federal de Santa Catarina, UFSC, Oct. 21, 2019. https://repositorio.ufsc.br/handle/123456789/215191.

Barrera, "Concepção de um interferometro robusto usando polaraização para inspeção com shearografia em ambientes com vibração", Dissertação de Mestrado, Universidade Federal de Santa Catarina, UFSC, Mar. 3, 2016. https://repositorio.ufsc.br/xmlui/handle/123456789/168218.

Willmann et al., "Detecção de defeitos em juntas adesivas de tubos compósitos com shearografia, termografia e ultra-som", CONAEND & IEV. https://docplayer.com.br/15714181-Conaend-iev-071-deteccao-de-defeitos-em-juntas-adesivadas-de-tubos-compositos.html.

* cited by examiner

SHEAROGRAPHY AND INTERFEROMETRY SENSOR WITH MULTIDIRECTIONAL DYNAMIC PHASE SHIFTING AND METHOD OF INSPECTION AND MEASUREMENT OF VIBRATION MODES

CROSS-REFERENCE TO RELATED APPLICATIONS

This application is a National Stage entry of International Application No. PCT/BR2020/050481, filed on Nov. 17, 2020, which claims priority to Brazilian Patent Application No. BR 1020190249463, filed on Nov. 26, 2019. The disclosures of the priority applications are hereby incorporated in their entirety by reference.

FIELD OF THE INVENTION

The present invention addresses to a multidirectional shearography and interferometry sensor with dynamic phase shifting (DPSI). The configuration used in the present invention comprises three fixed prisms, or a single fixed three-facet optical prism, constructed so as to achieve the same effect as three prisms and thus simultaneously obtain three images with phase shifting. This configuration markedly distinguishes the present invention from the prior art, which uses two images or performs the phase shifting by moving different prisms to obtain two or more images.

Shearography is a robust technique that is being widely used in industry. However, the traditional configuration has limits of robustness and can be susceptible to certain levels of vibration; for example, those displayed on oil platforms or ships. The application of composite materials in the Oil and Gas field has been growing a lot in recent years, boosting the development of systems and techniques for the non-destructive inspection of structures in operation.

The configuration proposed by the present invention manages to overcome the difficulties of robustness with the use of a multidirectional sensor that reduces the time of image collection. This reduction allows obtaining images with higher resolution and in regions with greater operational interferences, such as vibrations; for example, those presented on oil platforms or on ships. The combination of these factors makes it possible to inspect regions that were not inspectable with previous systems.

In addition to ensuring operational safety, the non-destructive inspection, according to the present invention, contributes to the fact that composite material structures can have their operating cycles extended.

DESCRIPTION OF THE STATE OF THE ART

Shearography is an interferometric optical measurement technique that uses the speckle effect of the laser. The test object is illuminated with an expanded laser source, and an image is captured by a camera connected to a computer for recording and processing. A lateral displacement device, typically a modified Michelson interferometer, is used to produce two superimposed images of the object. The displacement between images makes the technique sensitive to the displacement field gradient outside the object plane and, therefore, is directly sensitive to surface deformation. The comparison of the captured image with a reference image of the object points out deformations in the material.

A known embodiment of the state of the art consists of a schematic of the optical configuration containing two wedge prisms, two apertures, lenses and a camera. The double image is generated by the refraction of light passing through the wedge-shaped prisms. Carrier fringes are produced by interference from waves that pass through a double-aperture mask. The mask is placed just behind the wedge prisms.

It is assumed that the light wave propagated through the apertures is spherical. Then, the interference between spherical wavefronts will result in parallel fringes corresponding to Young's fringes.

The difference between the optical paths defines whether the interference will be constructive or destructive at each point of the bulkhead. Regions will be formed where the interference will be constructive (light fringes), alternated by regions with destructive interference (dark fringes). The distance between the light fringes depends on the distance between the slits, the distance from the aperture to the camera sensor, and the wavelength.

In the image sensor, the fringe spacing is related to the pixel size and can guarantee a higher density of fringes, without loss of information. The speckle size must be large enough to contain all the fringe information.

Currently, these systems are used mainly for the non-destructive inspection of composite materials used in the Oil and Gas industry, with emphasis on the analysis of metallic pipes repaired with composite materials. Another important application in this industrial sector is the inspection of glued joints of pipes entirely made of composite material (pipes and fittings made of composite material made with the filament winding process).

Document CN108871220A discloses a phase inverter that includes a control module and three modules of phase shifting and average refractive index of three modules of phase shifting. Three modules of phase shifting are arranged in a way that the thickness of these three modules decreases; the drive module rotates and thus can change the positions of the modules of phase shifting of three phases so as to introduce different amounts of phase shifting at different times. The time shifter sets the modules of phase shifting with different thickness to accurately input the amount of phase shifting in a phase shifting process, thus effectively avoiding phase shifting errors caused by ceramic piezoelectric creep properties, hysteresis, and non-linear characteristics. However, it is observed in this document that the phase shifting is carried out mechanically, differently from what is proposed by the present invention.

No document of the state of the art discloses a multidirectional shearography sensor such as the one of the present invention.

BRIEF DESCRIPTION OF THE INVENTION

The present invention addresses to a multidirectional dynamic phase shifting interferometry (DPSI) and shearography sensor. The invention uses a configuration with three fixed prisms, or a single fixed three-facet optical prism, constructed so as to achieve the same effect as three prisms. This arrangement provides greater resistance to the vibrations present in the field and the ability to carry out inspections faster than current inspections (increase in inspection speed of the order of 24 times compared to the traditional system with phase shifting). Accordingly, the proposed configuration allows the simultaneous acquisition of images with different directions of lateral displacement, quickly and enabling dynamic measurements of displacements or deformations (displacement gradients).

BRIEF DESCRIPTION OF DRAWINGS

The present invention will be described in more detail below, with reference to the attached figures, which, in a schematic way and not limiting the inventive scope, represent examples of its embodiment. In the drawings, there are.

DETAILED DESCRIPTION OF THE INVENTION

The present invention will be described in detail below with reference to the above-mentioned Figures, which in no way signify or represent limitations that may be imposed on the inventive scope as claimed herein. In this sense, and to facilitate the understanding of the constituent elements of the invention, the following reference list is presented:

1—Reference point
2—Bulkhead
3—Camera sensor
4—Triple lateral displacement
L1—Lens
W1-3—Wedge-shaped prisms
5—Reference image
6—Triple displacement image
Z—Distance from aperture to camera sensor 3
8—Combination of apertures
9—Simulation of carrier fringes
10—Fast Fourier Transform
11—Equivalent lateral displacement
12-14—Combinations of two apertures
15—Combination of three apertures
*—Opposition in relation to origin
$A_{1-3}$—Apertures
$C_x$—Displacement on the x axis
$A_x$—Arrangement on the x axis
$C_y$—Displacement on the y axis
$A_y$—Arrangement on the y axis
$C_{xy}$—Displacement at −45° from the x-axis direction
$A_{xy}$—Arrangement on the straight line at −45° from the x-axis direction
A—Arrangement at origin
16—Filtered Fast Fourier Transforms
17—Phase maps
18—Orientation of the lateral displacement
19—Reference beam
20—Mirror
22—Displaced images
$S_y$—Carrier fringes for the shearography components on the y-axis
$H_x$—Carrier fringes for the DSPI components on the y-axis
$H_{xy}$—Carrier fringes for DSPI components at −45° from the x-axis direction
Δϕ—Phase map resulting from the difference between the deformed map (acquired after loading) and the reference map
23—Multidirectional measurement head
24—Charging or excitation module
25—Lighting laser
26—Fixing structure
27—Repair in composite material with internal defect
28—Metal Pipe with through-hole
f1—Focal length 1
f2—Focal length 2
29—Video camera
30—CCD or CMOS Image Sensor
31—Internal lens
32—Mask of apertures
33—Three-facet optical prism
34—Objective lens
35—Semi-mirror or Beam splitter
36—First surface mirror
37—Specimen
38—DSPI-Shearography multidirectional head
39—Original phase difference maps
40—Phase difference maps after applying a sine/cosine low pass filter
41—Phase difference maps after processing for phase jump removal 42—Loudspeaker
43—Circular membrane
44—Beam splitter
45—Acquired image and its two-dimensional frequency spectrum by Fast Fourier Transform
46—Extraction of the main components in the Fourier plane by applying an elliptical band pass filter
47—Resulting phase maps of each component
48—Enlarged view of a region of the phase map, showing the orientation of the carrier fringes
49—Fast Fourier Transform, DSPI-Shearography
w—Out-of-plane displacement component
s—Deformation field The use of the present invention is to perform instantaneous measurements of shearography or speckle interferometry (DSPI) in multiple directions of sensitivity.

Figure 1:
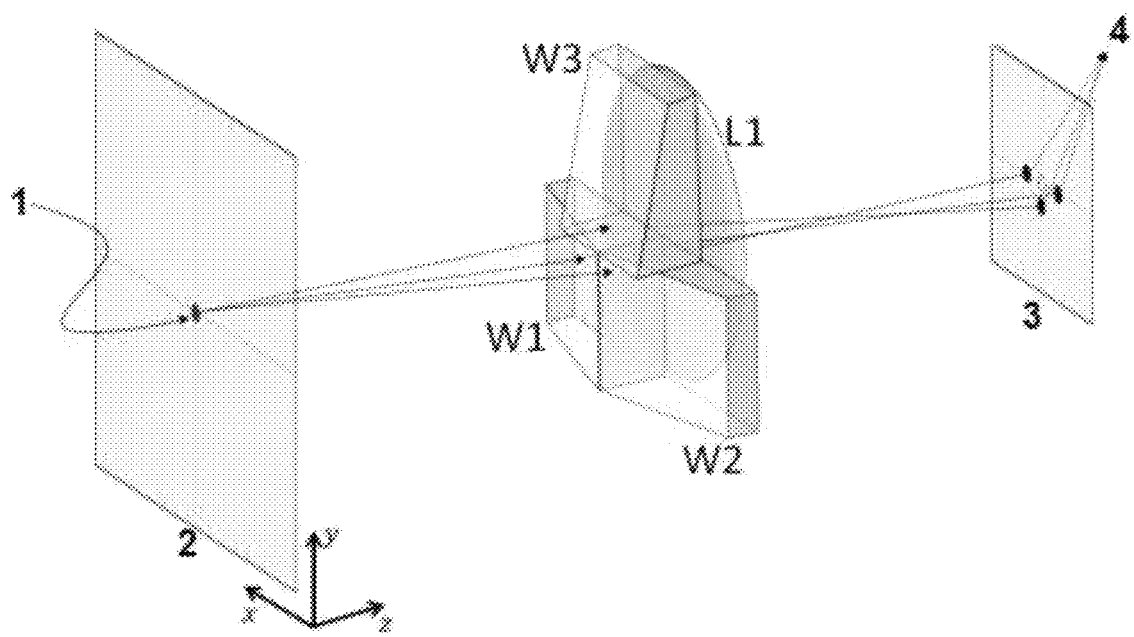
FIG. 1 illustrates a diagram of the triple displacement formation using three wedge-shaped prisms.
Figure 2:
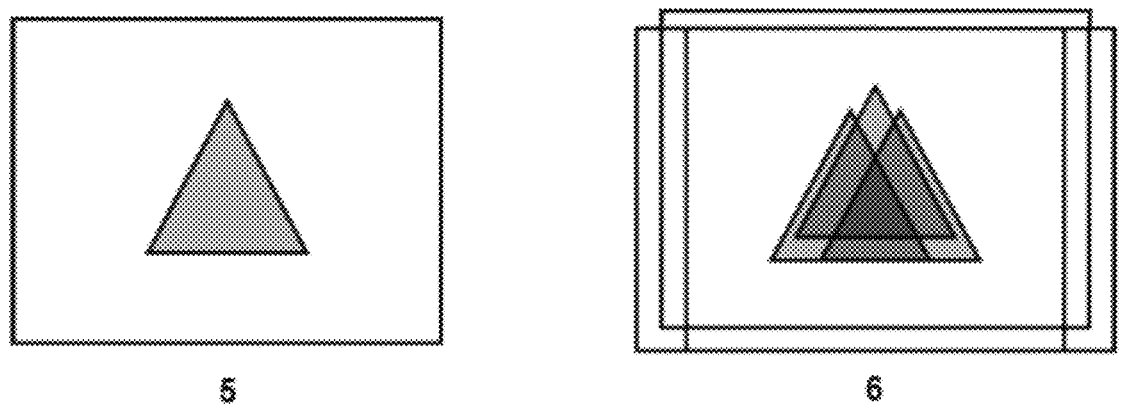
FIG. 2 illustrates a representation of the displacement caused by the arrangement of three wedge-shaped prisms.

Multiple directions of shearography sensitivity (4) can be captured simultaneously using a single image (1) with the addition of a new optical component. A third wedge-shaped prism (W3) was included in the configuration to generate a third laterally displaced image, as shown in FIG. 1. FIG. 2, in turn, illustrates the image of a triangle (5) when captured by the camera sensor (3) in this configuration. The main difficulty of this configuration is the data complexity generated by the interference of three displaced images (6), causing greater computational effort to separate each displacement component in the Fourier spectrum.

Figure 3:
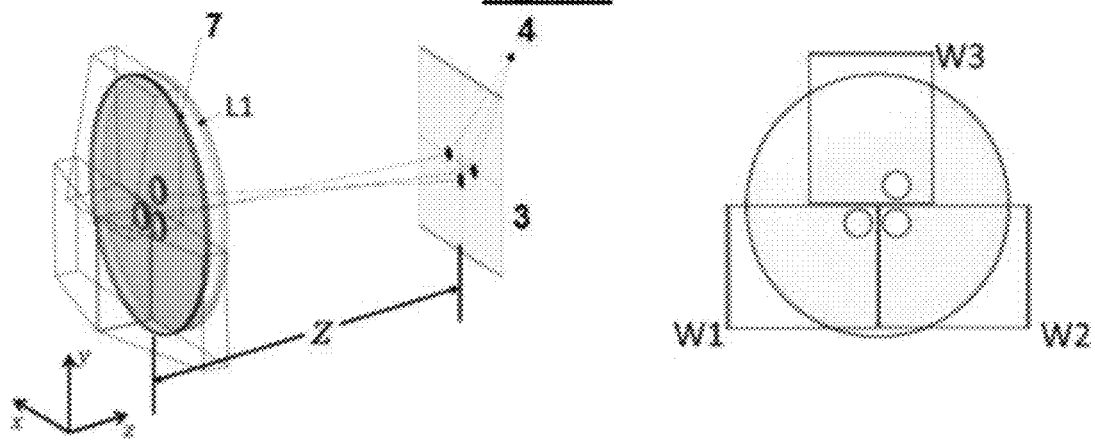
FIG. 3 illustrates an optical arrangement for triple shearography with three apertures.

In order to enable the separation of the three displacement components in the Fourier spectrum, three apertures are included in the optical configuration (7), as shown in FIG. 3. The three apertures (7) function as three pairs of apertures, and each pair generates a set of carrier fringes with three different orientations, allowing to isolate each component in the Fourier spectrum.

Figure 4:
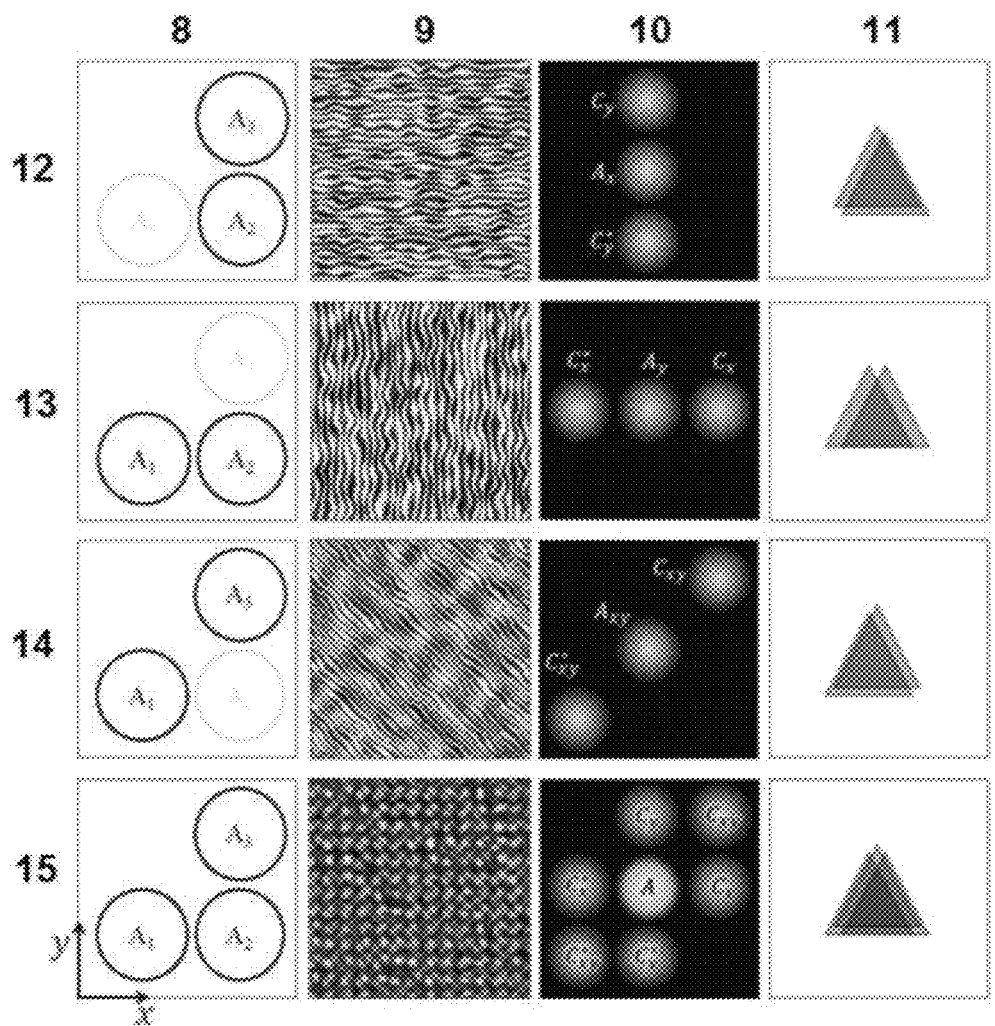
FIG. 4 illustrates a diagram of the different combinations of apertures, a speckle simulation with carrier fringes, an equivalent spectrum by fast Fourier transform and equivalent laterally displaced images.

FIG. 4 shows the different arrangements (13-15) of aperture (8), the resulting Fourier spectrum (10) and the respective displacement images (11) observed by the camera sensor (3).

According to the provisions (8) presented in FIG. 4, the arrangement ($A_{2,3}$ 8;12) generates a set of carrier fringes (9;12) in the direction of the y axis, ($A_{1,2}$ 8;13) generates a set of carrier fringes (9;13) in the x-axis direction, and ($A_{1,3}$ 8;14) generates an oblique set of carrier fringes (9;14) at −45° of the x-axis direction. Therefore, each pair of apertures produces a set of carrier fringes perpendicular to the line joining their centers (9). The carrier fringe contains the interference generated by the double image (11)—a laterally displaced image, produced by a pair of prisms W.

Figure 5:
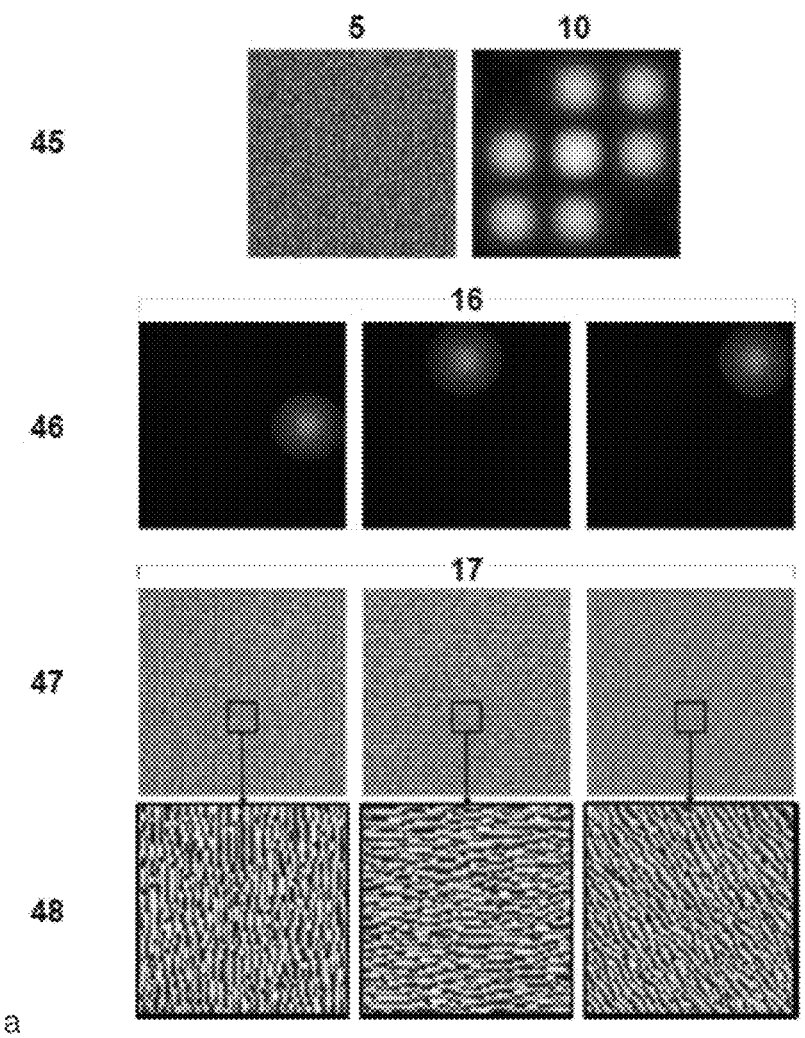
FIG. 5 illustrates steps to extract the different phase maps for each displacement component. Acquired image and its two-dimensional frequency spectrum by fast Fourier transform. Extraction of the main components in the Fourier plane by applying an elliptical band pass filter. Resulting phase maps of each component. Enlarged view of a region of the phase map, showing the orientation of the carrier fringes.

Each component C in the Fourier spectrum (10) corresponds to a single lateral displacement shift orientation. $C_x$ indicates a lateral displacement in the x-axis direction (10; 13). $C_{xy}$ denotes a transverse displacement at −45° (10;14) and $C_{xy}$ a displacement at −135° (10;12). In this way, with only a single reference image (5), it is possible to obtain information from the three phase maps (17) simultaneously, in different displacement directions. This fact leads to an increase in speed and consequently a gain in productivity of the inspection process by shearography. FIG. 5 shows the image processing steps (45-48) to retrieve the reference phase map (17) for each displacement component.

Figure 6:
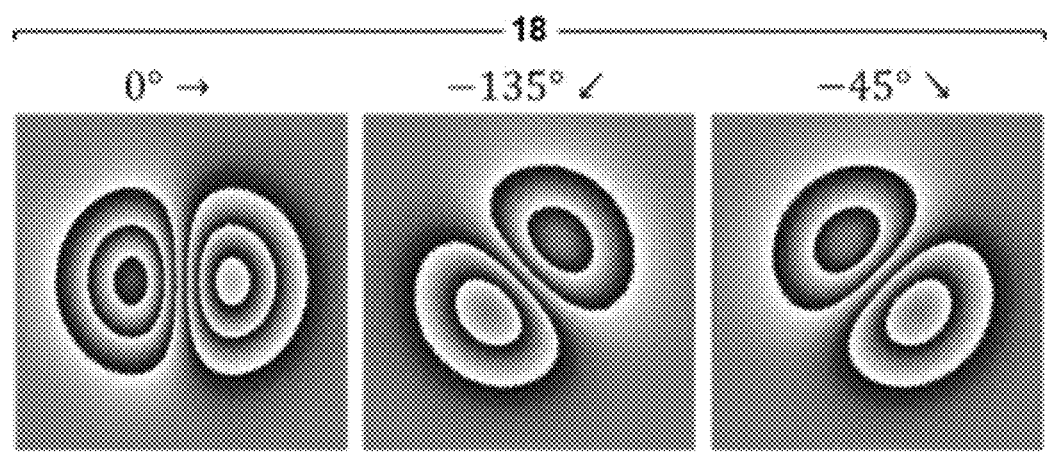
FIG. 6 illustrates a simulation of the phase difference maps for triple shearography.

The same process is repeated for the images of the structure in the deformed state, produced by the application of a load. Therefore, from the difference between the reference image and the one after a deformation, it is possible to obtain, from a single shearography measurement, the phase difference maps referring to three different displacement directions (18). The resulting maps are shown in FIG. 6.

With some adaptations to the configuration of multiple apertures presented above, it is possible to have an alternative configuration that allows to obtain, in a simultaneous way, results of two interferometric techniques: shearography and DSPI (Digital Speckle Pattern Interferometry).

Figure 7:
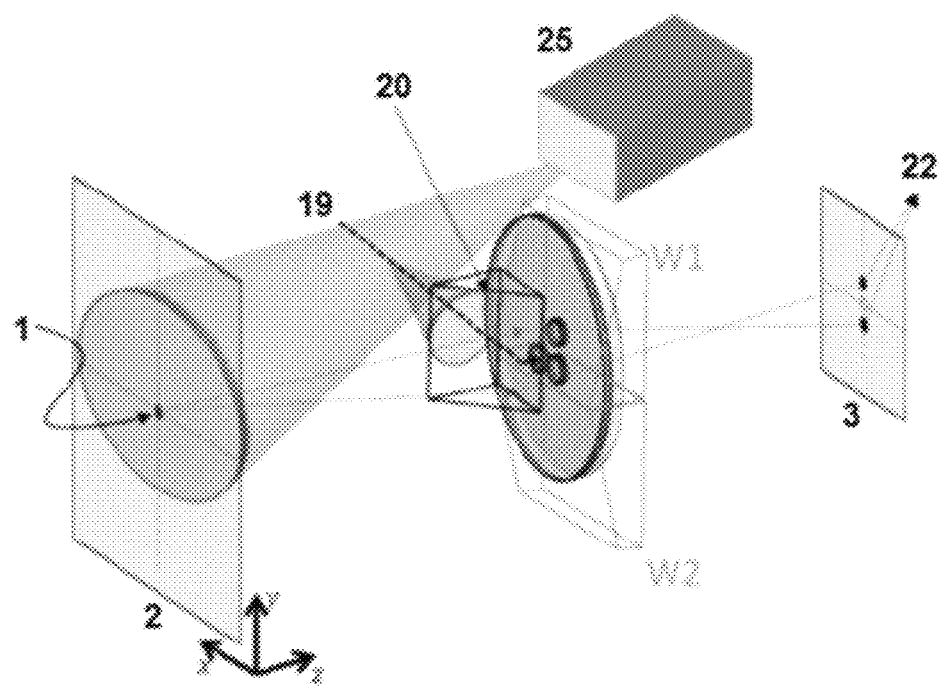
FIG. 7 illustrates a configuration for simultaneous measurement of shearography and DSPI.

Configuration Adaptation with Multiple Apertures for Simultaneous Measurement DSPI-Shearography:

As shown in FIG. 7, if the third aperture contains a coherent reference beam (19) it is possible to obtain, always from a single acquisition for each loading state, two simultaneous results (49): one of DSPI (Digital Speckle Pattern Interferometry) that results in a displacement field, and a shearography field that results in the fields of the derivatives of displacements (or deformation gradient), given a lateral displacement direction.

Figure 8:
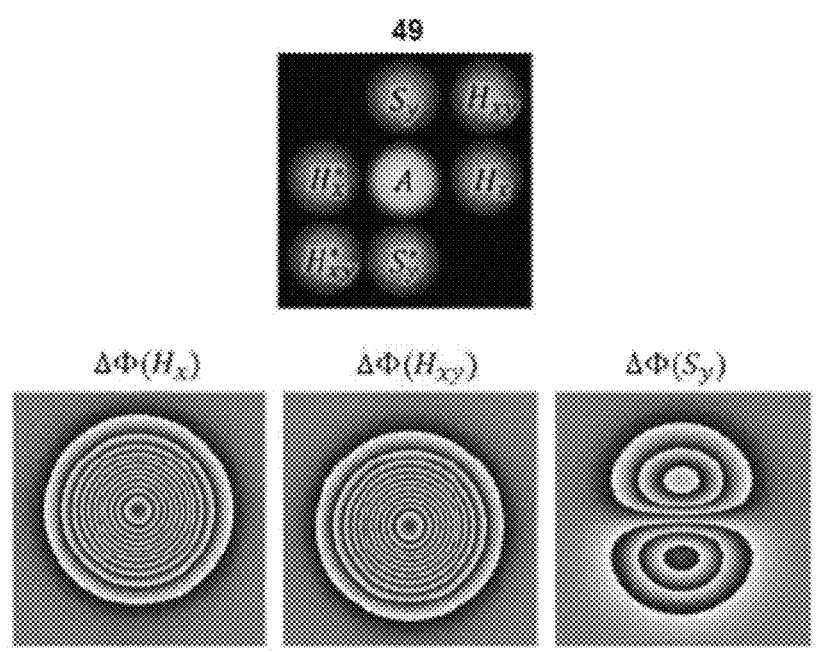
FIG. 8 illustrates a simulation of the simultaneous results of shearography and DSPI.

FIG. 8 shows a simulation of the result with the proposed configuration. The halos identified by the letter H in the fast Fourier transform image (49) represent the spectrum of the carrier fringes for the DSPI components and the S halos represent the carrier fringes for the shearographic components.

With this new optical arrangement, it is possible to obtain, simultaneously, the "out-of-plane" displacement field (DSPI) and the deformation gradient (shearography) for the analyzed surface. Obtaining both results facilitates the extraction of mechanical parameters from the structure and complements the mechanical analysis.

The optical configurations detailed above are applied within the measurement heads (23) of non-destructive inspection systems.

The multidirectional head for multidirectional shearography/DPSI measurements is simply coupled to the computer by means of the specific video camera interface (29) used in the equipment, such as a USB or GigE interface. The acquisition of images is performed by means of this interface.

Figure 9:
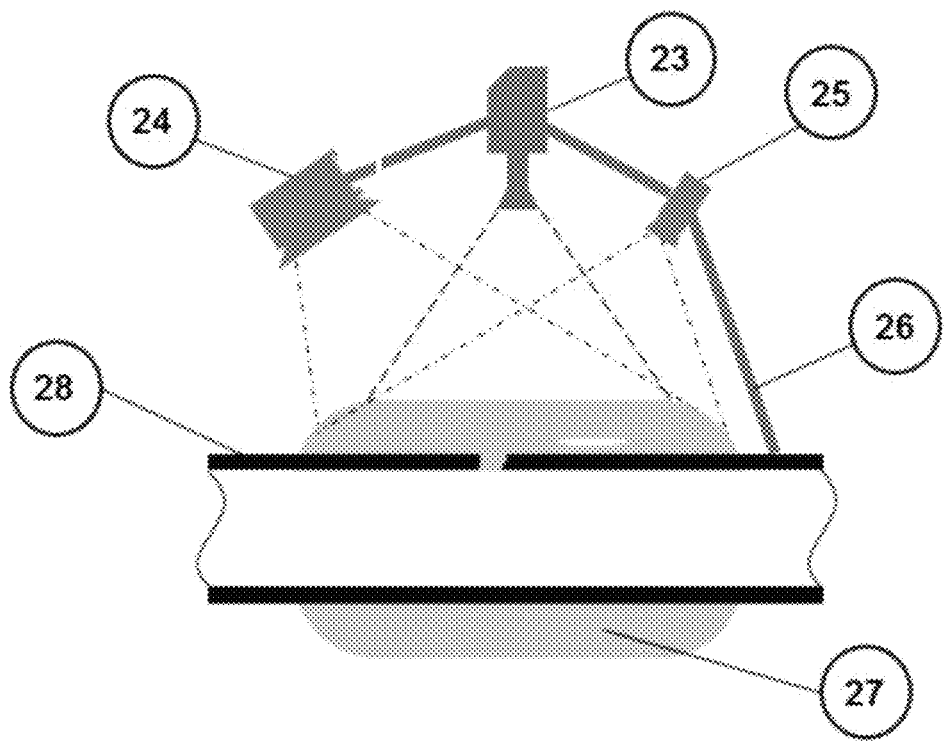
FIG. 9 illustrates a general configuration of a shearography system for non-destructive inspections in composite material repair.

The inspection system is basically composed of the following components: a multidirectional measurement head (23) interconnected, on one side, to a charging or excitation module (24), and, on the other side, to a lighting laser (25), which are supported by a fixing structure (26). In addition to showing the basic components of a shearography system, FIG. 9 also illustrates the inspection of a defective composite coating (27) applied to metallic piping (28). This piping may also contain defects in its metal wall, such as loss of thickness or through-hole (28).

The inspection procedure using multidirectional shearography for the non-destructive analysis of composite repair can be divided into the following steps:
a) Positioning the shearography system in front of the inspection area;
b) Acquisition of the image of the reference state;
c) Application of the load for excitation of the repair;
d) Acquisition of the image of the structure in the deformed state;
e) Processing (subtraction) of the acquired images with presentation of the final images with the Fringe Maps (also called Phase Difference Maps) in the three directions of sensitivity for the identification of defects by the inspector.

Since the present invention is aimed at multidirectional shearography, only the operation of the multidirectional head will be detailed below.

Figure 10:
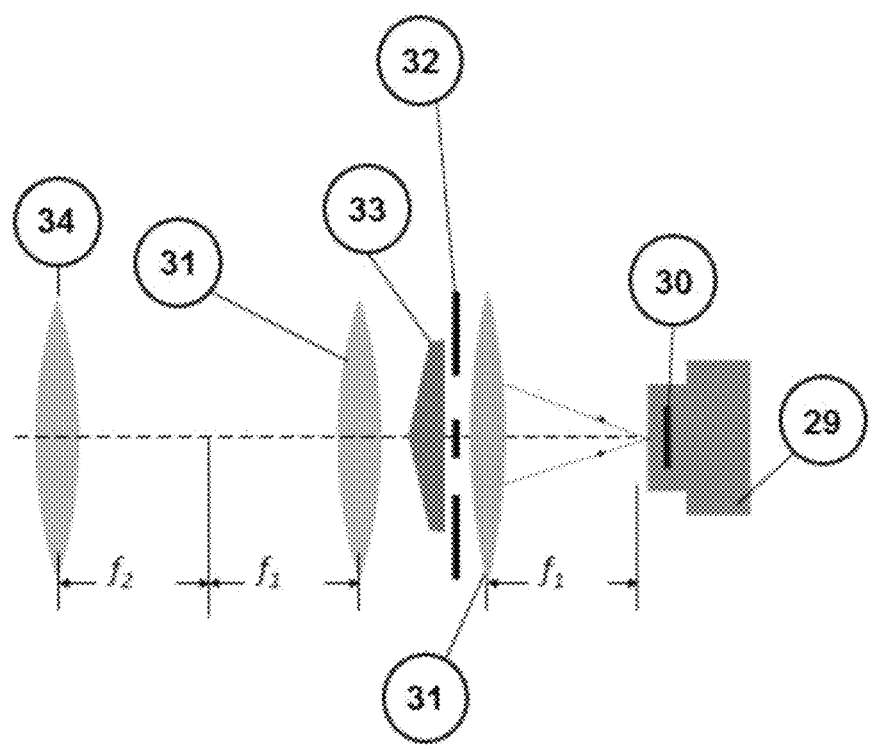
FIG. 10 illustrates internal components of the multidirectional shearography head.

The multidirectional head, as illustrated in FIG. 10, comprises the following components: a digital video camera (29), a digital camera image sensor (30), an internal lens (31), an aperture mask (32), a prism optic (33) and an objective lens (34).

The surface of the inspected structure reflects laser light (25) towards the multidirectional inspection head. Laser light reflected from the composite surface enters the multidirectional head through the objective lens (34), and is projected onto the image sensor (30) after passing through the internal components of the head. The internal components (31-33) are responsible for the formation of the double image and the carrier fringes in the three preferred measurement directions. The processing to obtain the shearography results is done as previously described.

Figure 11:
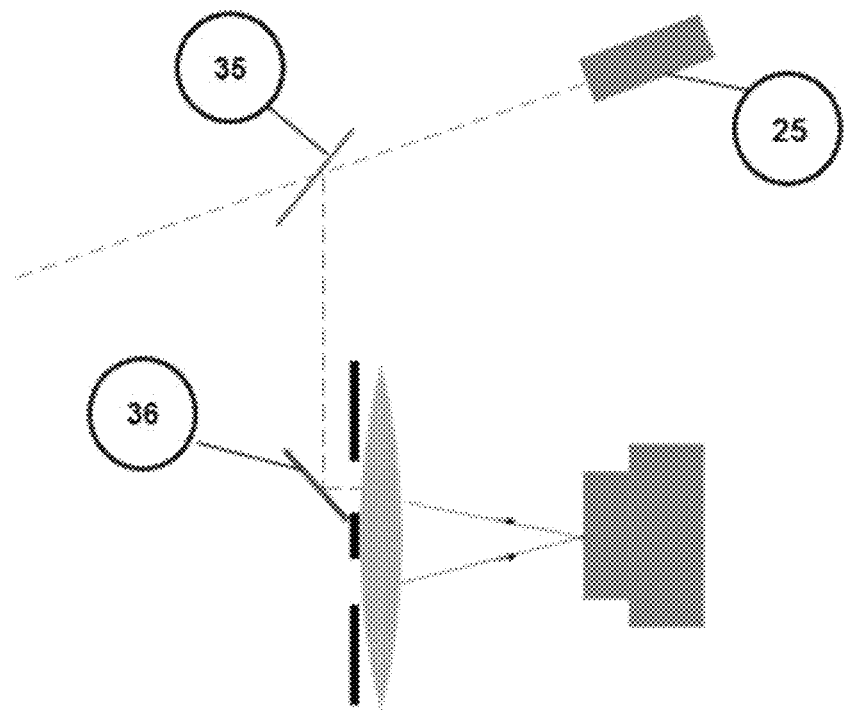
FIG. 11 illustrates the addition of optical components for simultaneous measurement of Shearography and DPSI.

For simultaneous measurement of DPSI and shearography, the optical arrangement of the system is modified with the insertion of a semi-mirror (beam splitter) (35) and a first surface mirror (36) arranged at 45° to direct the reference beam to the image sensor (30), as shown in FIG. 11. The processing to obtain the shearography results is done as previously described.

Several measurements using the configuration according to the present invention were performed for different specimens, and their results are shown in the figures described below. The following figures also show the experimental configuration, as well as the three simultaneous shearography/DPSI results obtained before and after the application of a low-pass filter.

Figure 12:
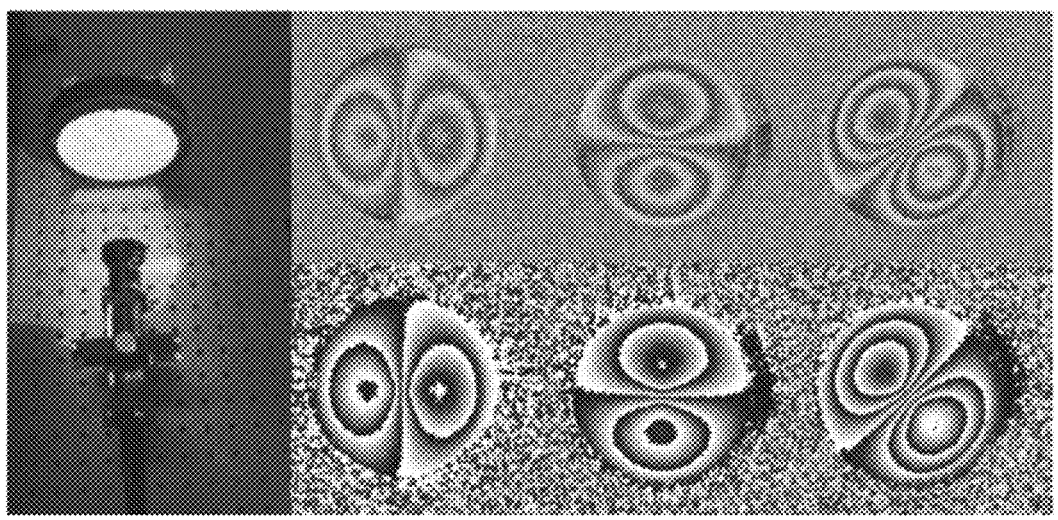
FIG. 12 illustrates the simultaneous measurement for a circular specimen with mechanical loading applied by a micrometric screw supported at its posterior central point. Dimensions of the aluminum circular plate: 2 mm of thickness and 150 mm of diameter.
Figure 13:
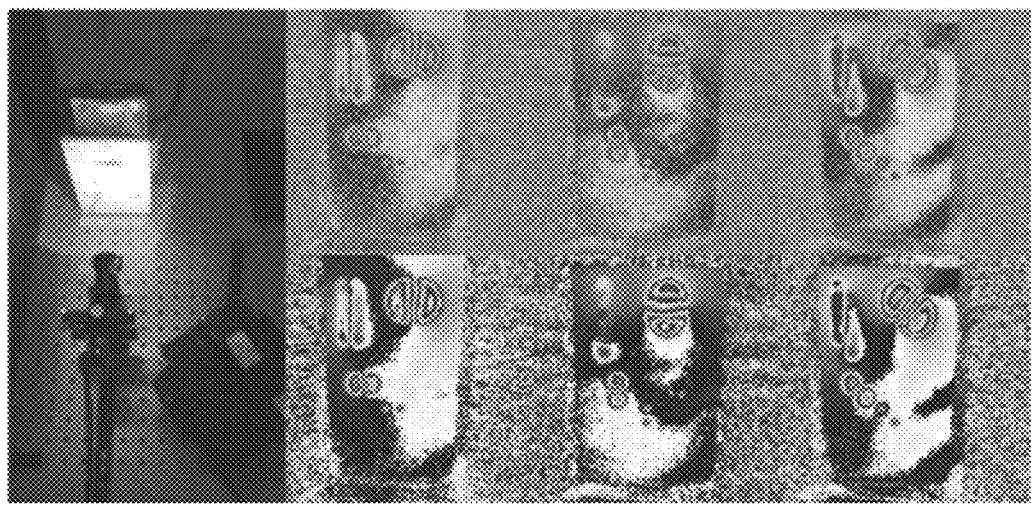
FIG. 13 illustrates the simultaneous measurement with a flat aluminum specimen coated in composite material and excited with thermal loading. The fringe concentrations show the positions of the internal defects.
Figure 14:
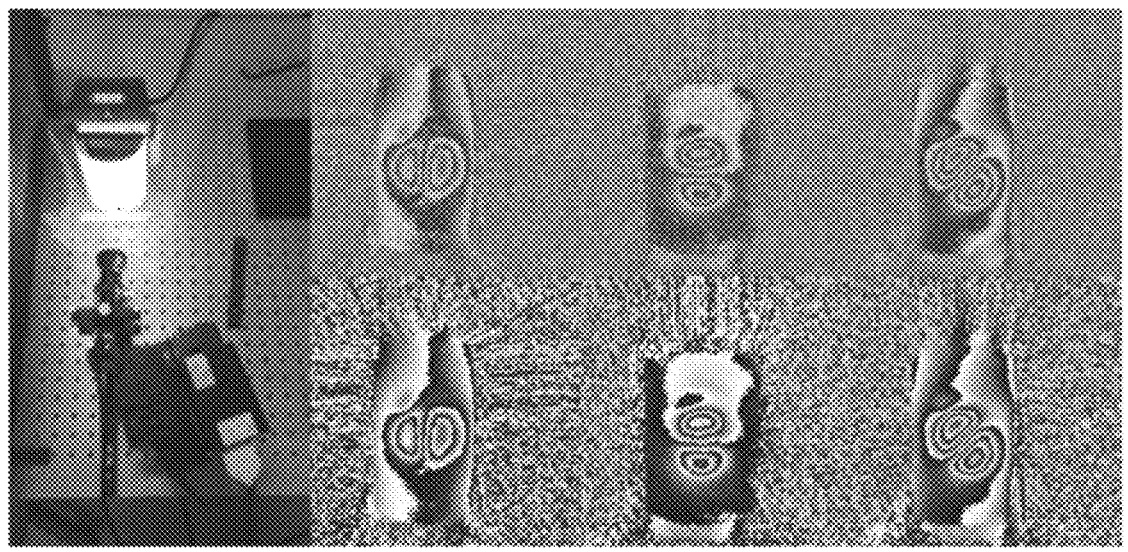
FIG. 14 illustrates the simultaneous measurement of a gutter-shaped specimen with composite coating and thermal loading. The central fringes show the position of the defect repaired by the coating.

The results shown in FIG. 12-14 demonstrate the feasibility of instantaneous shearography measurement in three different lateral displacement directions (4), by means of the multiple aperture principle (7) and the three-facet optical prism W.

Figure 15:
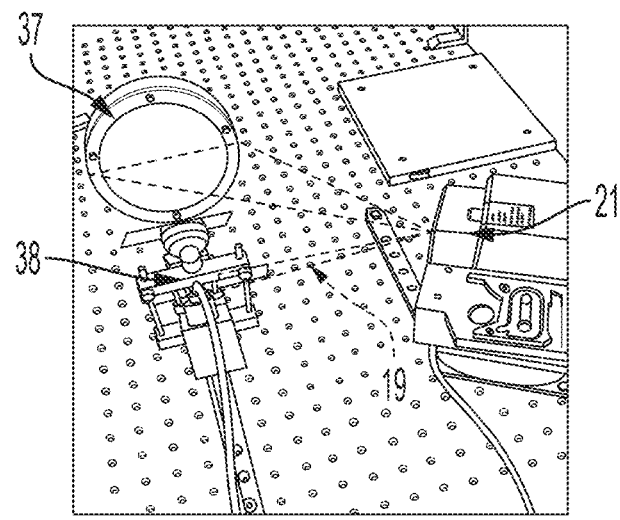
FIG. 15 illustrates an experimental configuration for simultaneous measurement of DSPI-Shearography.
Figure 16:
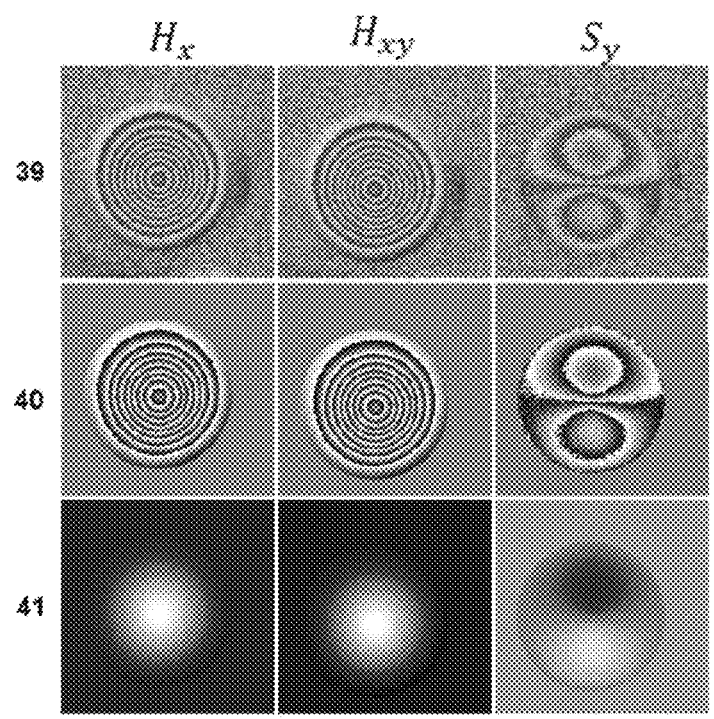
FIG. 16 illustrates phase maps resulting from the simultaneous measurement of DSPI-Shearography.

DSPI-Shearography Simultaneous Measurement:

The measurement of the displacement component outside the plane w by Speckle Interferometry (DSPI) and, simultaneously, the measurement of the deformation field s by shearography, was validated by means of the configuration presented in FIG. 7, whose experimental configuration is shown in FIG. 15. The specimen used in the validation was the same as shown in FIG. 12. The mechanical loading is performed by means of a micrometric screw, positioned at the central point behind the plate to provide a controlled deformation. The phase difference maps resulting from the measurement are shown in FIG. 16.

Figure 17:
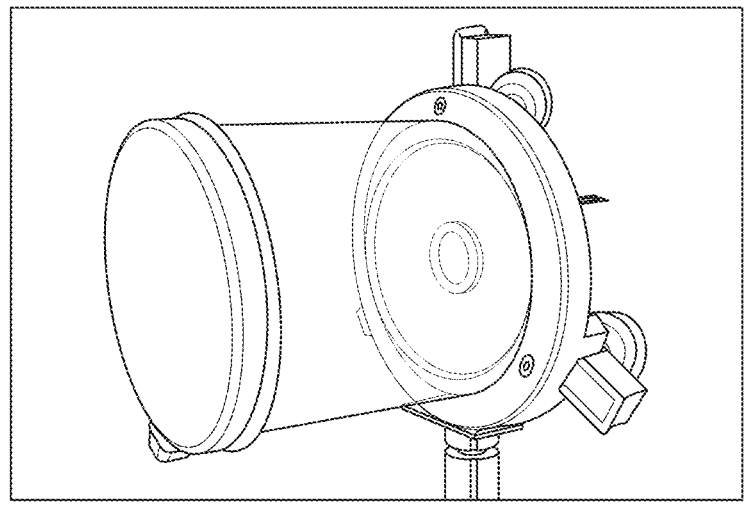
FIG. 17 illustrates a specimen for testing the visualization of vibration modes.
Figure 18:
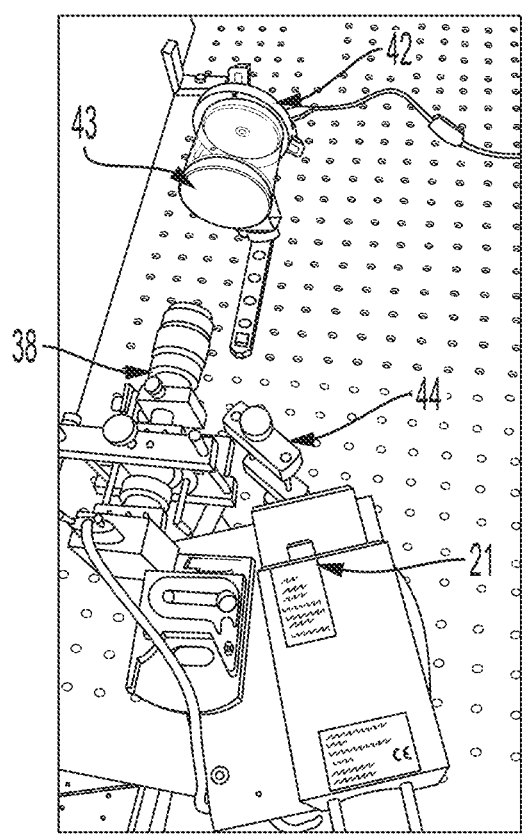
FIG. 18 illustrates the experimental configuration to visualize the vibration modes.

Measurement of Vibration Modes:

Additionally, measurements were made of the vibration modes of a latex membrane, painted with white matte paint, glued to the end of an acrylic tube. Vibration loading was carried out by means of a loudspeaker glued to the other end of the tube. The specimen is shown in FIG. 17 and the experimental configuration in FIG. 18. The excitation signal was generated by means of a function generator connected to the loudspeaker. In the experimental configuration, the DSPI-Shearography configuration was used, where it is possible to directly measure the out-of-plane displacement component.

Figure 19:
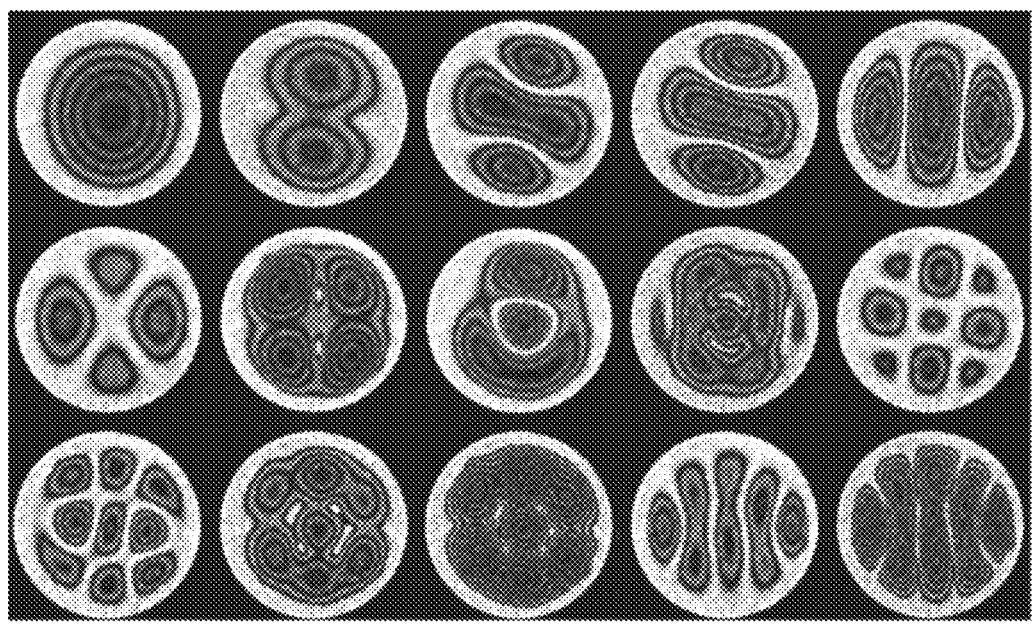
FIG. 19 illustrates images of circular membrane vibration modes obtained with the proposed configuration in DSPI. Increasing frequency from left to right and from top to bottom.
Figure 20:
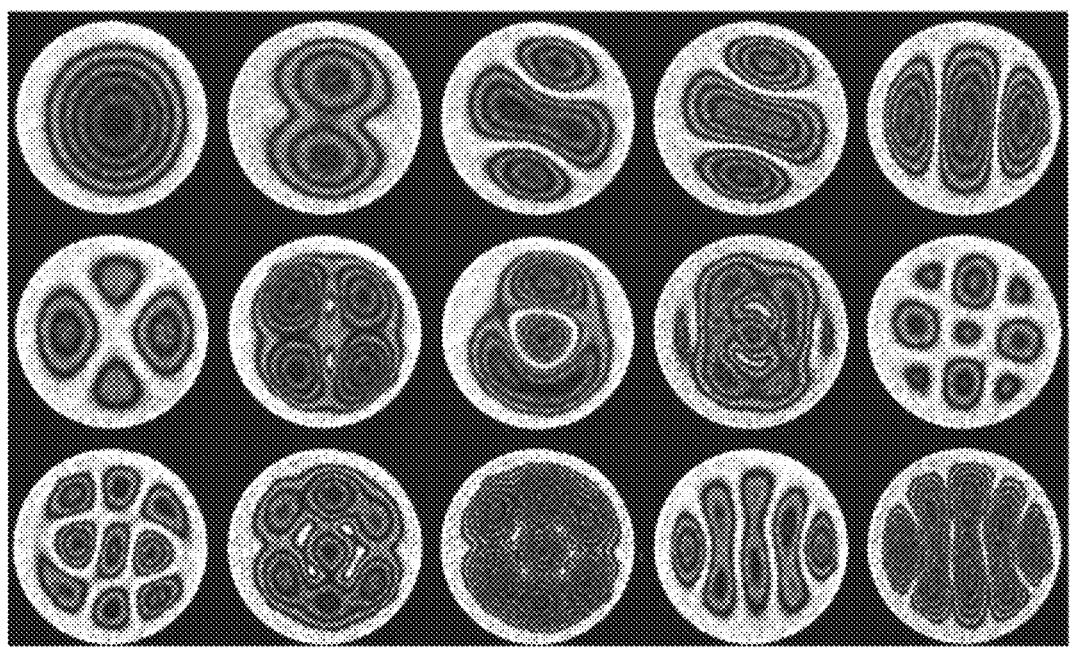
FIG. 20 illustrates images of circular membrane vibration modes obtained with the shearography configuration and lateral displacement in y. Increasing frequency from left to right and from top to bottom.

The images obtained were processed in the Fourier plane and the results for each vibration mode, after applying a low pass filter to reduce speckle noise, are shown in FIG. 19 and FIG. 20.

The invention claimed is:

1. A SHEAROGRAPHY AND INTERFEROMETRY SENSOR WITH MULTIDIRECTIONAL DYNAMIC PHASE SHIFTING (DPSI), comprising:
a multidirectional measurement head interconnected, on one side, to a charging or excitation module, and, on the other side, to a lighting laser, which are supported by a fixing structure, wherein the multidirectional measurement head comprises an optical prism, an objective lens, a first internal lens positioned between the optical prism and the objective lens, and a second internal lens, wherein the optical prism is positioned between the first internal lens and the second internal lens.

2. THE SHEAROGRAPHY AND INTERFEROMETRY SENSOR WITH MULTIDIRECTIONAL DYNAMIC PHASE SHIFTING according to claim 1, wherein the multi directional measurement head further comprises a digital video camera, a digital camera image sensor, and an aperture mask.

3. THE SHEAROGRAPHY AND INTERFEROMETRY SENSOR WITH MULTIDIRECTIONAL DYNAMIC PHASE SHIFTING, according to claim 2, wherein the digital camera image sensor is of a CCD or CMOS type.

4. THE SHEAROGRAPHY AND INTERFEROMETRY SENSOR WITH MULTIDIRECTIONAL DYNAMIC PHASE SHIFTING according to claim 2, wherein the optical prism is a three-facet optical prism.

5. THE SHEAROGRAPHY AND INTERFEROMETRY SENSOR WITH MULTIDIRECTIONAL DYNAMIC PHASE SHIFTING according to claim 2, wherein the optical prism is one of three wedge-shaped optical prisms ($W_{1-3}$).

6. THE SHEAROGRAPHY AND INTERFEROMETRY SENSOR WITH MULTIDIRECTIONAL DYNAMIC PHASE SHIFTING according to claim 1, comprising optical components for simultaneous measurement of shearography and DPSI, wherein said optical components are a semi-mirror or beam splitter and a first surface mirror disposed at 45° with respect to the second internal lens.

7. A METHOD OF INSPECTION AND MEASUREMENT OF VIBRATION MODES, using the shearography and interferometry sensor with multidirectional dynamic phase shifting as defined in claim 1, comprising:
a) Positioning of said shearography and interferometry sensor with multidirectional dynamic phase shifting in front of an inspection area;
b) Acquisition of an image of a reference state;
c) Application of a load for excitation of a repair;
d) Acquisition of an image of a structure in a deformed state ($\Delta\phi$); and
e) Processing of the acquired images with a presentation of final images with fringe maps in three sensitivity directions for identification of defects.

8. THE SHEAROGRAPHY AND INTERFEROMETRY SENSOR WITH MULTIDIRECTIONAL DYNAMIC PHASE SHIFTING according to claim 1, wherein the charging or excitation module is a loudspeaker.

* * * * *